United States Patent
Moon et al.

(10) Patent No.: US 9,369,665 B2
(45) Date of Patent: Jun. 14, 2016

(54) VIDEO RECORDING APPARATUS FOR VEHICLE AND VIDEO RECORDING METHOD FOR VEHICLE

(71) Applicant: Electronics and Telecommunications Research Institute, Daejeon (KR)

(72) Inventors: Dae Sung Moon, Daejeon (KR); Han Sung Lee, Gyeonggi-do (KR); Jin Woo Choi, Seoul (KR); Ki Young Moon, Daejeon (KR); Jang Hee Yoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 85 days.

(21) Appl. No.: 13/921,928

(22) Filed: Jun. 19, 2013

(65) Prior Publication Data

US 2014/0178030 A1 Jun. 26, 2014

(30) Foreign Application Priority Data

Dec. 20, 2012 (KR) ......................... 10-2012-0149178

(51) Int. Cl.
 *H04N 5/77* (2006.01)
(52) U.S. Cl.
 CPC ...................................... *H04N 5/772* (2013.01)
(58) Field of Classification Search
 CPC .................................................. G06K 9/00845
 USPC ........................................................ 386/224
 See application file for complete search history.

(56) References Cited

U.S. PATENT DOCUMENTS

| 2006/0187305 A1* | 8/2006 | Trivedi et al. ................. 348/169 |
| 2009/0022368 A1* | 1/2009 | Matsuoka et al. ............. 382/103 |
| 2012/0069301 A1* | 3/2012 | Hirata ........................... 351/209 |

FOREIGN PATENT DOCUMENTS

| KR | 10-2012-0026202 | 3/2012 |
| KR | 10-2012-0077455 | 7/2012 |
| KR | 10-1241803 | 3/2013 |

* cited by examiner

*Primary Examiner* — Hung Dang
*Assistant Examiner* — Girumsew Wendmagegn
(74) *Attorney, Agent, or Firm* — Nelson Mullins Riley & Scarborough LLP

(57) ABSTRACT

Disclosed is a video recording apparatus for a vehicle, which includes a camera unit formed so as to change a capturing direction; a driver's viewing direction detecting unit configured to detect a driver's viewing direction; a control unit configured to control the camera unit so that the detected viewing direction corresponds to the capturing direction; and a storing unit configured to store a video obtained by the camera unit. Therefore, a video in a direction at which the driver views is obtained and stored without mounting a plurality of cameras so that it is possible to obtain a video for a situation of an accident of a vehicle of the driver or a vehicle of another driver occurring not only in the front of the driver's vehicle but also in the side of the driver's vehicle.

3 Claims, 5 Drawing Sheets

_VIDEO RECORDING APPARATUS FOR VEHICLE AND VIDEO RECORDING METHOD FOR VEHICLE_

CROSS-REFERENCE TO RELATED APPLICATIONS

This application claims priority to and the benefit of Korean Patent Application No. 10-2012-0149178 filed in the Korean Intellectual Property Office on Dec. 20, 2012, the entire contents of which are incorporated herein by reference.

TECHNICAL FIELD

The present disclosure relates to a video recording apparatus for a vehicle and a video recording method for a vehicle, and more specifically, to a video device for a vehicle, a video recording apparatus for a vehicle, and a video recording method for a vehicle which obtain and store a video using a camera which is configured to rotate in one or more directions.

BACKGROUND ART

A video device for a vehicle refers to a device which is provided in a vehicle to obtain a video of an exterior of the vehicle or a video of an interior of the vehicle on the front, the side, or the rear of the vehicle. A video recording apparatus for a vehicle refers to a device which stores the video obtained by the video device for a vehicle and maintains the video for a predetermined period of time.

Such a video recording apparatus for a vehicle is generally mounted near a rear view mirror in the vehicle or on a dashboard to obtain and store a video. The video obtained by the video recording apparatus for a vehicle is very useful as an objective evidential material in order to analyze a situation when a vehicle which is parked or stopped is broken down or a car accident occurs. Therefore, in recent years, a case of mounting the video recording apparatus for a vehicle is significantly increased.

In the meantime, for some purposes, it is required to obtain videos which are captured in various directions such as the front, the side, and the rear of the vehicle through the video recording apparatus for a vehicle. In this case, a plurality of cameras needs to be provided in the vehicle in accordance with the capturing directions because the capturing direction is fixed when the camera is mounted.

In recent years, in accordance with the development of an intelligent vehicle, demands for video information obtained in various directions with respect to the vehicle are increased so that the number of cameras which are provided in the vehicle is correspondingly increased. However, if the plurality of cameras is provided so as to correspond to the required capturing direction, the cost is disadvantageously increased.

SUMMARY OF THE INVENTION

The present invention has been made in an effort to provide a video recording apparatus for a vehicle and a video recording method for a vehicle which are capable of adjusting a capturing direction in accordance with a direction at which a driver views during driving.

An exemplary embodiment of the present invention provides a video recording apparatus for a vehicle including: a camera unit formed so as to change a capturing direction; a driver's viewing direction detecting unit configured to detect a driver's viewing direction; a control unit configured to control the camera unit so that the detected viewing direction corresponds to the capturing direction; and a storing unit configured to store a video obtained by the camera unit.

The driver's viewing direction detecting unit may detect the viewing direction using video information on a face direction of the driver.

The driver's viewing direction detecting unit may detect the viewing direction using posture information of the driver.

The camera unit may be configured to be panned and tilted.

Another exemplary embodiment of the present invention provides a video recording method for a vehicle including: recognizing a capturing direction of a camera unit; detecting a viewing direction of a driver; changing the capturing direction of the camera unit so as to match the capturing direction of the camera unit and the viewing direction of the driver; and storing a video obtained by the camera unit.

In the detecting of a viewing direction of a driver, the viewing direction may be detected using video information on a face direction of the driver.

The viewing direction may be detected using posture information of the driver.

According to exemplary embodiments of the present invention, by configuring to adjust a capturing direction of a camera unit in accordance with a viewing direction of a driver, a video in a direction at which the driver views is obtained and stored without mounting a plurality of cameras.

Therefore, it is possible to obtain a video for a situation of an accident of a vehicle of the driver or a vehicle of another driver occurring not only in the front of the driver's vehicle but also in the side of the driver's vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
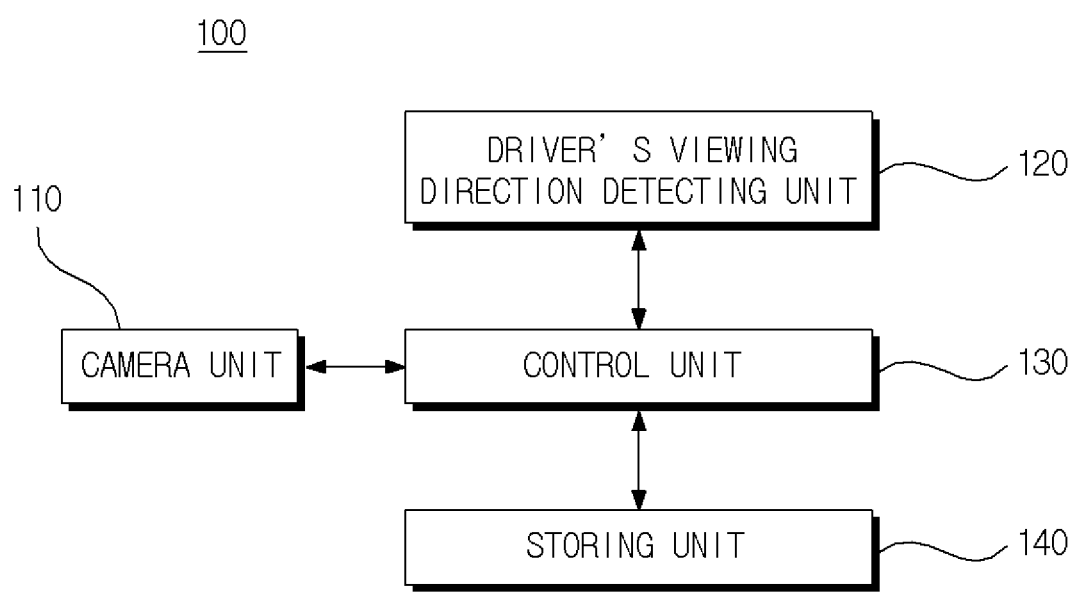
FIG. 1 is a view illustrating a video recording apparatus for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to accompanying drawings. First, in the drawings, it should be noted that the same reference numerals denote the same or similar parts even though the parts are illustrated in different drawings. Hereinafter, the exemplary embodiments of the present invention will be described but the technical spirit of the present invention is not limited thereto but the exemplary embodiments may be modified so to be embodied in various manners by those skilled in the art.

The exemplary embodiment of the present invention has a technical feature which controls a camera unit so as to match a driver's viewing direction with a capturing direction of the camera unit.

FIG. 1 is a view illustrating a video recording apparatus for a vehicle according to an exemplary embodiment of the present invention.

Referring to FIG. 1, the video recording apparatus 100 for a vehicle according to the exemplary embodiment of the present invention includes a camera unit 110, a driver's viewing direction detecting unit 120, a control unit 130, and a storing unit 140.

First, the camera unit 110 functions to mainly obtain an external video of the vehicle. The camera unit 110 may include a camera and a video processing module which processes a video captured by the camera. In this case, the camera may be configured to change a capturing direction or a focal distance. In one exemplary embodiment, the camera unit 110 may include a PTZ (pan tilt zoom) camera. The PTZ camera refers to a camera which pans in a vertical direction and a horizontal direction and extends a focal distance. In the PTZ camera, an actuator which tilts and swivels the camera and a controller which controls the actuator to be driven may be provided.

In the meantime, the camera unit 110 may be provided inside the wind shield or on a dashboard of the vehicle. The camera unit 110 may be additionally provided inside a rear side glass of the vehicle so as to capture the rear of the vehicle, in addition to the front of the vehicle.

The camera unit 110 may also function as a video device to recognize a lane or obtain road information for autonomous navigation.

Next, the driver's viewing direction detecting unit 120 will be described.

The driver's viewing direction detecting unit 120 functions to detect an eyesight direction of the driver. In order to detect a viewing direction of the driver, a face direction and a pupil direction of the driver, and a posture of the driver are detected to determine the viewing direction.

Figure 2:
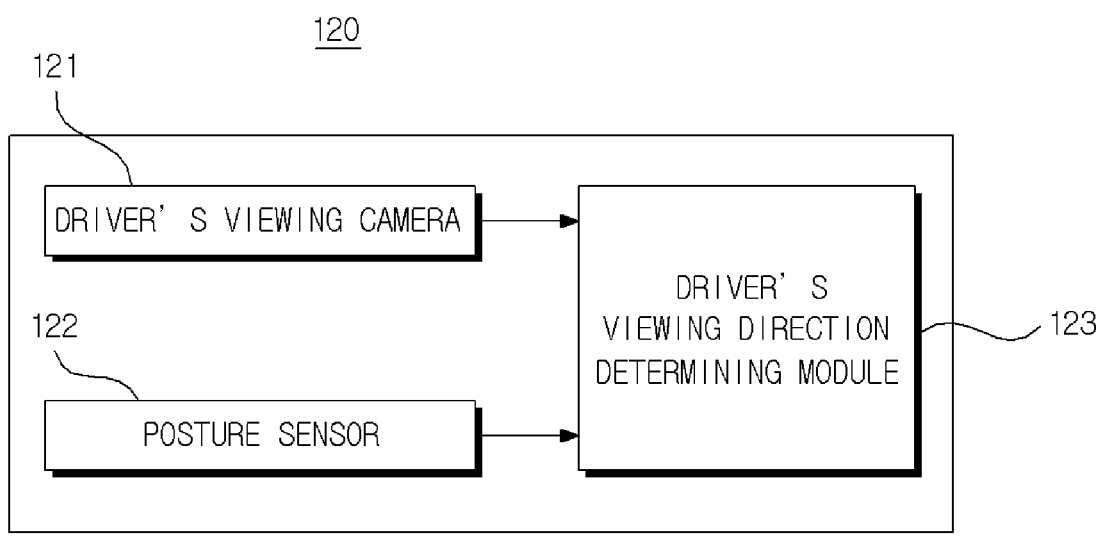
FIG. 2 is a view illustrating a driver's viewing direction monitoring unit illustrated in FIG. 1.

FIG. 2 is a view illustrating the driver's viewing direction monitoring unit illustrated in FIG. 1.

In an exemplary embodiment, referring to FIG. 2, the driver's viewing direction detecting unit 120 may include an additional driver's viewing camera 121 which obtains video information on the face direction or the pupil direction of the driver. The driver's viewing camera 121 may be a camera which is provided in the vehicle or a camera which is provided inside or outside a portable terminal device such as a smart phone or a smart pad.

In the meantime, the driver's viewing direction detecting unit 120 may include a posture sensor 122 which detects a driving posture. An example of the posture sensor includes a gyro sensor which is attached to glasses or an accessory which is worn on a face or a head of the driver.

The driver's viewing direction detecting unit 120 may include a driver's viewing direction determining module 123 which determines the driver's viewing direction. The driver's viewing direction determining module 123, first, detects the driver's viewing direction by estimating a pose using a video of a face of the driver obtained from the driver's viewing camera 121.

The pose estimation using the face video of the driver using information obtained from the above-mentioned driver's viewing camera 121 and posture sensor 122 may be performed by applying a pose estimating method such as ASM (active shape model) or an AAM (active appearance model) to the obtained face video. Here, the ASM refers to a method that finds an object in the image using shape information (feature point extracting) of an object and the AAM refers to a method that finds an object in the image using shape information and texture information of the object, which is an improved ASM method.

Alternatively, the driver's viewing direction determining module 123 may process the video for the pupil obtained from the driver's viewing camera 121 to detect the viewing direction of the driver.

In the meantime, the driver's viewing direction determining module 123 may consider at least two of the face direction, the pupil direction, and the posture information of the driver in combination to more precisely detect the viewing direction of the driver.

Next, the control unit 130 will be described.

Figure 3:
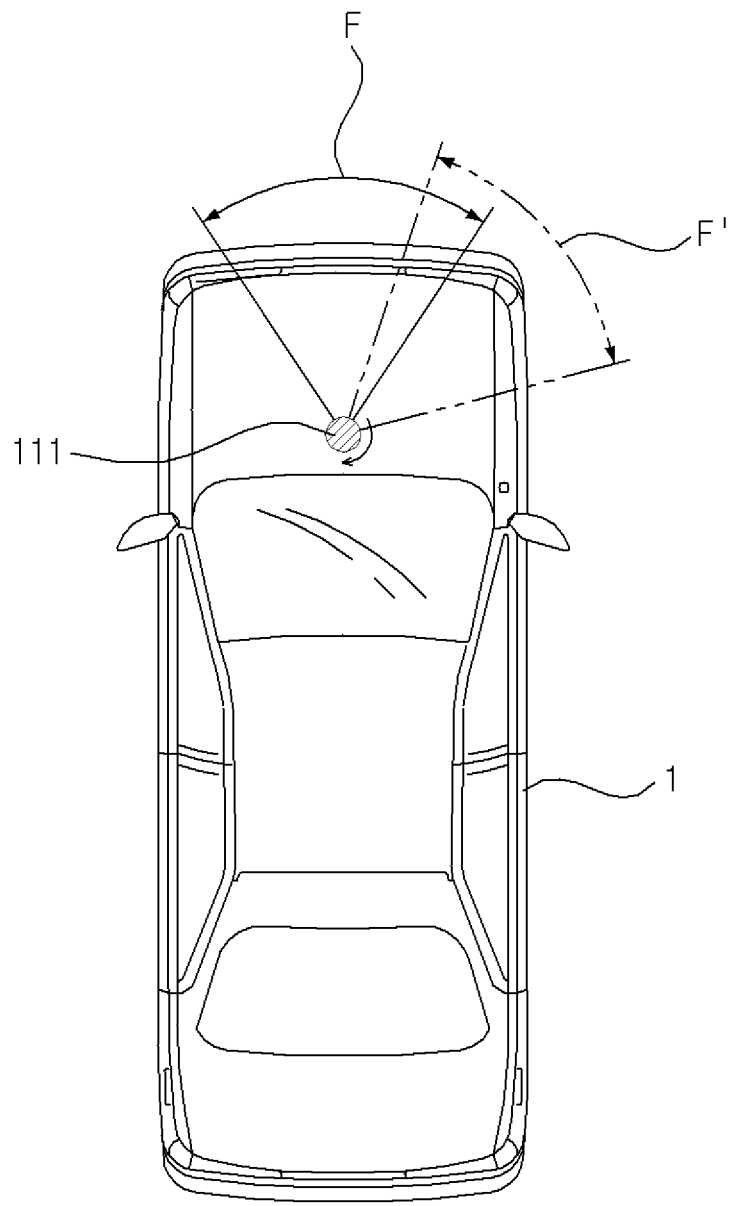
FIG. 3 is a view illustrating change of the capturing direction of a camera unit corresponding to the driver's viewing direction.

The control unit 130 adjusts the capturing direction of the camera unit 110 so as to correspond to the detected viewing direction of the driver. FIG. 3 is a view illustrating change of the capturing direction of a camera unit corresponding to the driver's viewing direction and FIG. 4 is a view illustrating the change of the capturing direction of the camera unit in the front and the rear of the vehicle corresponding to the driver's viewing direction.

In an exemplary embodiment, the control unit 130 is connected to a controller of a PTZ camera 111 to generate a driving signal to operate the actuator of the PTZ camera 111 so as to match the detected viewing direction of the driver and the capturing direction.

Referring to FIG. 3, when the viewing direction of the driver is directed to the front of the vehicle 1, the capturing direction of the PTZ camera 111 may be represented by "F" of FIG. 3. For example, when the viewing direction of the driver is shifted to the right while driving, the control unit 130 may control the camera unit 110 so that the capturing direction of the PTZ camera 111 is represented by "F'" of FIG. 3.

Figure 4:
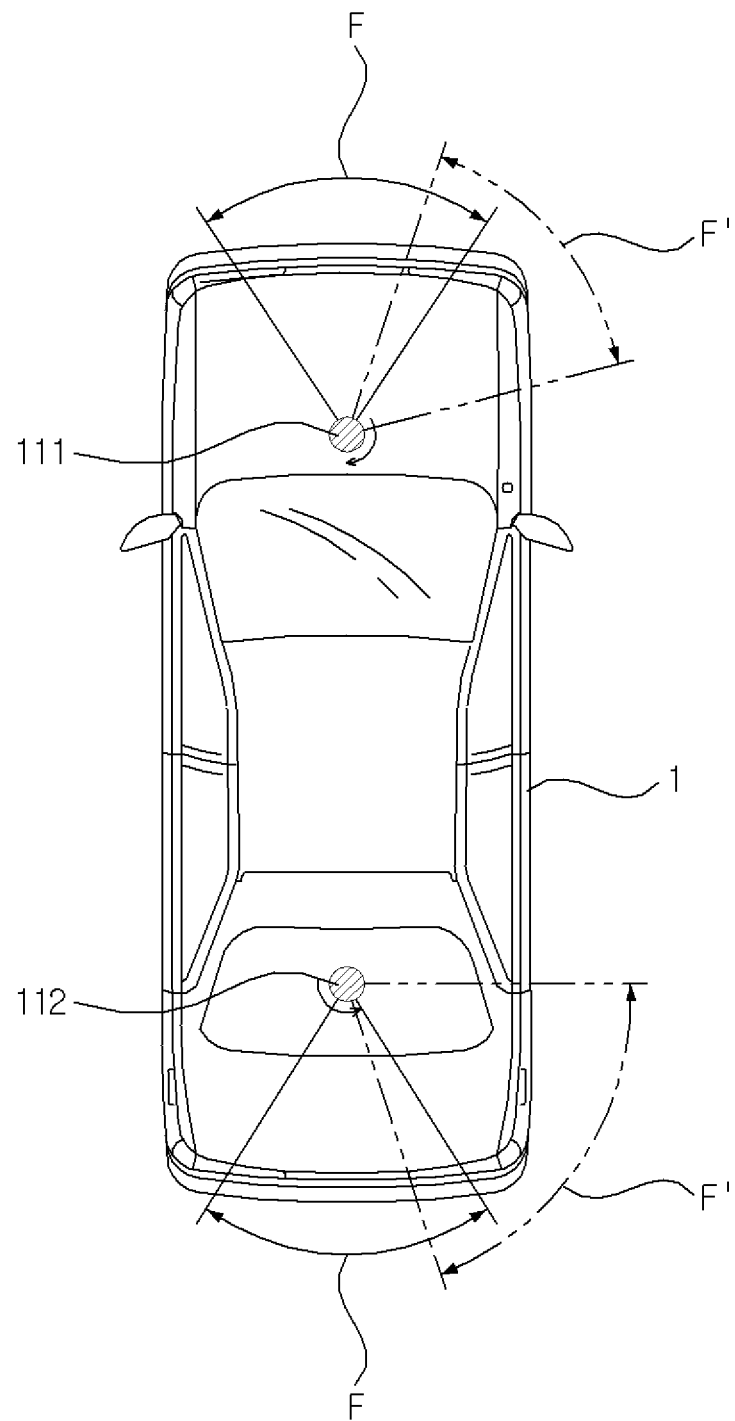
FIG. 4 is a view illustrating the change of the capturing direction of the camera unit in the front and the rear of the vehicle corresponding to the driver's viewing direction.

In the meantime, referring to FIG. 4, the PTZ cameras 111 may be provided in the front side and the rear side of the vehicle 1. For example, if the viewing direction of the driver is changed to the right side while driving, the control unit 130 controls the camera unit 110 so that the capturing directions of two PTZ cameras 111 which are provided at the front side and the rear side of the vehicle 1 are represented by "F'" of FIG. 3. The driver may store not only a video for an accident occurring in the front of the vehicle 1 but also a video for an accident situation occurring in the side or the rear of the vehicle 1 through the two PTZ cameras 111 which are provided at the front side and the rear side of the vehicle 1.

The control unit 130 stores only the video of the front of the vehicle 1 through the PTZ camera 111 provided in the front side of the vehicle 1 in a normal status. If a driver's chooses to rotate or change a lane is detected, the control unit 130 controls the camera unit 110 to operate the PTZ camera 111 provided at the rear side of the vehicle 1 to store a video of the rear of the vehicle 1 together with the video of the front through the driver's viewing direction detecting unit 120. When parking the vehicle, the control unit 130 controls the camera unit 110 to operate only the PTZ camera 111 provided at the rear side of the vehicle 1 to store only a video of the rear of the vehicle 1.

The control unit 130 is connected to a vehicle speed sensor to control the capturing direction of the PTZ camera 111 to be changed in accordance with the viewing direction of the driver only at a predetermined vehicle speed or higher.

When the viewing direction of the driver exceeds a predetermined threshold value or the viewing direction of the driver cannot be specified through the driver's viewing direction detecting unit 120, the control unit 130 may initialize the camera unit 110 so as to direct the capturing direction of the PTZ camera 111 to the front of the vehicle 1.

In the above description, even though it is described that the PTZ camera 111 is provided in the front side or the rear side of the vehicle 1, the present invention is not limited thereto and the PTZ camera 111 may be additionally provided at the side of the vehicle 1.

Next, the storing unit 140 stores the video obtained by the camera unit 110.

Figure 5:
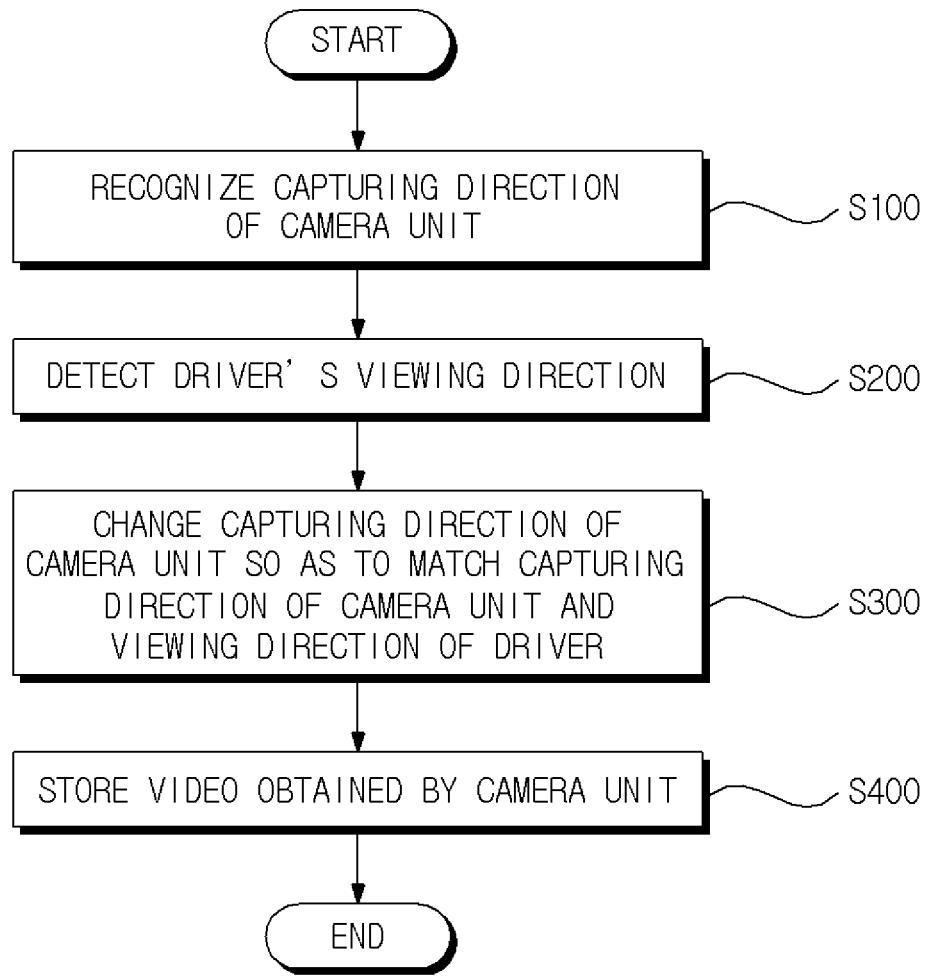
FIG. 5 is a flowchart illustrating a video recording method for a vehicle according to an exemplary embodiment of the present invention.

FIG. 5 is a flowchart illustrating a video recording method for a vehicle according to an exemplary embodiment of the present invention.

Referring to FIG. 5, in step S100, the video recording apparatus 100 for a vehicle according to an exemplary embodiment of the present invention recognizes a capturing direction of the camera unit 100.

Next, in step S200, the video recording apparatus 100 for a vehicle detects a viewing direction of the driver. In this case, the video recording apparatus 100 for a vehicle may detect the viewing direction using video information on a face direction of the driver. The video recording apparatus 100 for a vehicle may detect the viewing direction using posture information of the driver.

Next, in step S300, the video recording apparatus 100 for a vehicle changes the capturing direction of the camera unit 110 so as to match the capturing direction of the camera unit 110 and the viewing direction of the driver.

Next, in step S400, the video recording apparatus 100 for a vehicle stores the video obtained by the camera unit 110.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A video recording apparatus for a vehicle, comprising:
a camera unit formed so as to change a capturing direction;
a driver's viewing direction detecting unit configured to detect a driver's viewing direction, wherein the driver's viewing direction detecting unit detects the driver's viewing direction using video information on a face direction, pupil direction, and posture information of a driver, wherein the posture information of the driver is based on a gyro sensor attached to an accessory which is worn on a head of the driver;
a control unit configured to control the camera unit so that the detected viewing direction corresponds to the capturing direction; and
a storing unit configured to store a video obtained by the camera unit,
wherein the control unit stores a video from a first camera in the storing unit, and
wherein the control unit stores a video from a second camera in the storing unit if the driver's viewing direction meets a predetermined condition.

2. The apparatus of claim 1, wherein the camera unit is configured to be panned and tilted.

3. A video recording method for a vehicle, comprising:
recognizing a capturing direction of a camera unit;
detecting a viewing direction of a driver, wherein the viewing direction is detected using video information on a face direction, pupil direction, and posture information of the driver,
wherein the posture information of the driver is based on a gyro sensor attached to an accessory which is worn on a head of the driver;
changing the capturing direction of the camera unit so as to match the capturing direction of the camera unit and the viewing direction of the driver; and
storing a video obtained by the camera unit,
wherein a video obtained from a first camera is stored, and
wherein a video obtained from a second camera is stored if the viewing direction of the driver meets a predetermined condition.

* * * * *